(No Model.)  2 Sheets—Sheet 1.

T. H. PHILLIPS.
ROCK DRILL SUPPORT.

No. 581,612.  Patented Apr. 27, 1897.

Witnesses:
Hamilton D. Turner
Charles DeCou

Inventor:
Thomas H. Phillips
by his Attorneys
Howson & Howson (No Model.) 2 Sheets—Sheet 2.
T. H. PHILLIPS.
ROCK DRILL SUPPORT.
No. 581,612. Patented Apr. 27, 1897.
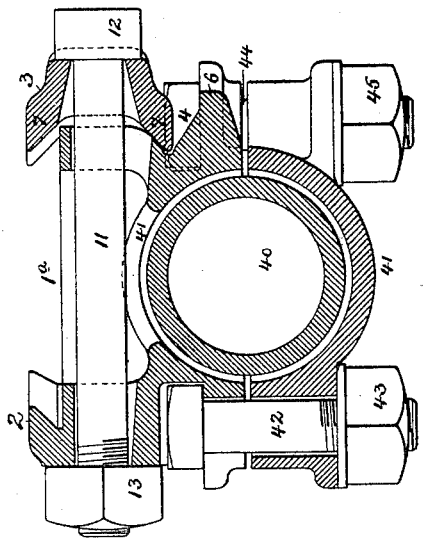
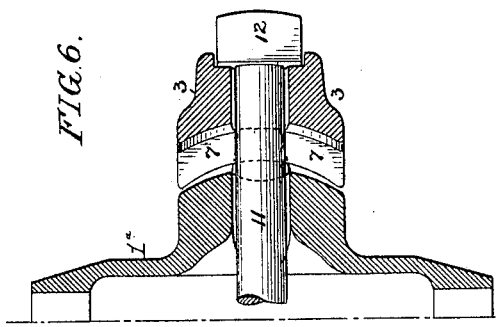
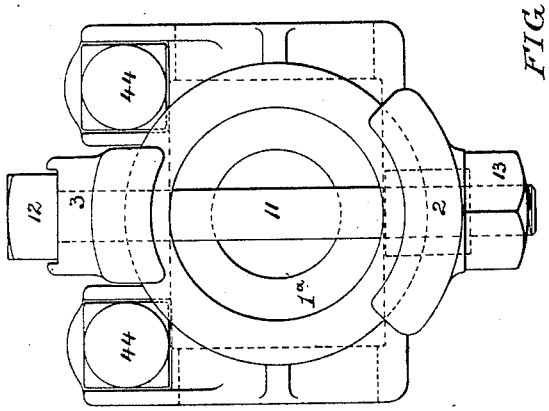
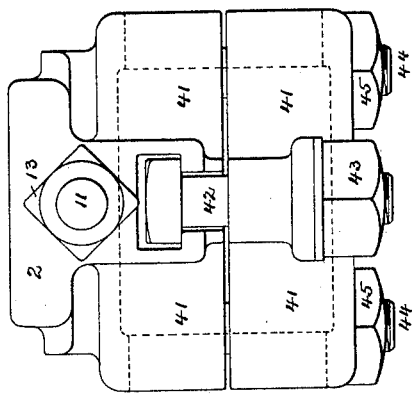
Witnesses:
Hamilton D. Turner
Charles De Cou
Inventor:
Thomas H. Phillips
by his Attorneys,
Howson & Howson

United States Patent Office.

THOMAS H. PHILLIPS, OF ST. DAVIDS, PENNSYLVANIA.

ROCK-DRILL SUPPORT.

SPECIFICATION forming part of Letters Patent No. 581,612, dated April 27, 1897.

Application filed November 7, 1896. Serial No. 611,405. (No model.)

*To all whom it may concern:*

Be it known that I, THOMAS H. PHILLIPS, a citizen of the United States, and a resident of St. Davids, Delaware county, Pennsylvania, have invented certain Improvements in Rock-Drill Supports, of which the following is a specification.

One object of my invention is to so construct a clamping device, such as is used in connection with rock-drill tripods or other supports, as to provide for the ready confinement or release of the shell or casing carrying the cylinder of the drill, and thereby permit of the pointing of the drill in any desired direction or the removal of the drill from or its replacement on the support, a further object being to provide for the ready movement of either of the legs of the tripod to any position which the desired firm support of the drill may require.

Another object of the invention is to cheapen and simplify the construction of the tripod and permit of the use throughout the same of ordinary bolts and nuts for clamping purposes, and a still further object is to permit movement in a vertical plane of the cheek-pieces carrying the rear leg of the tripod without loosening the side legs or interfering with the rigid connection of the base-plate thereto.

These objects I attain in the manner hereinafter set forth, reference being had to the accompanying drawings, in which—

Figure 4:
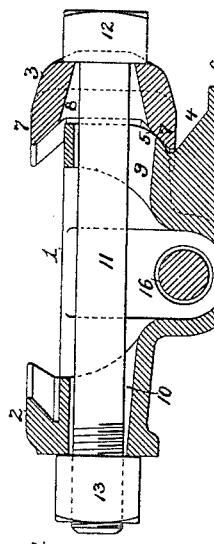
Figure 5:
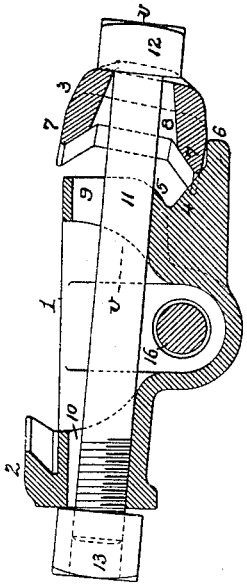
Figure 3:
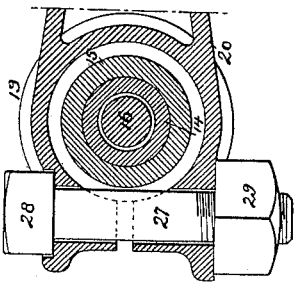
Figure 2:
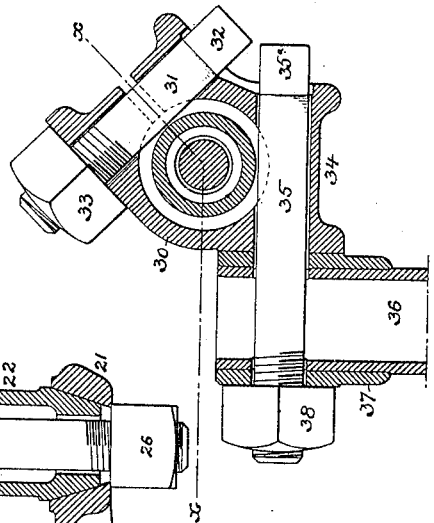
Figure 1:
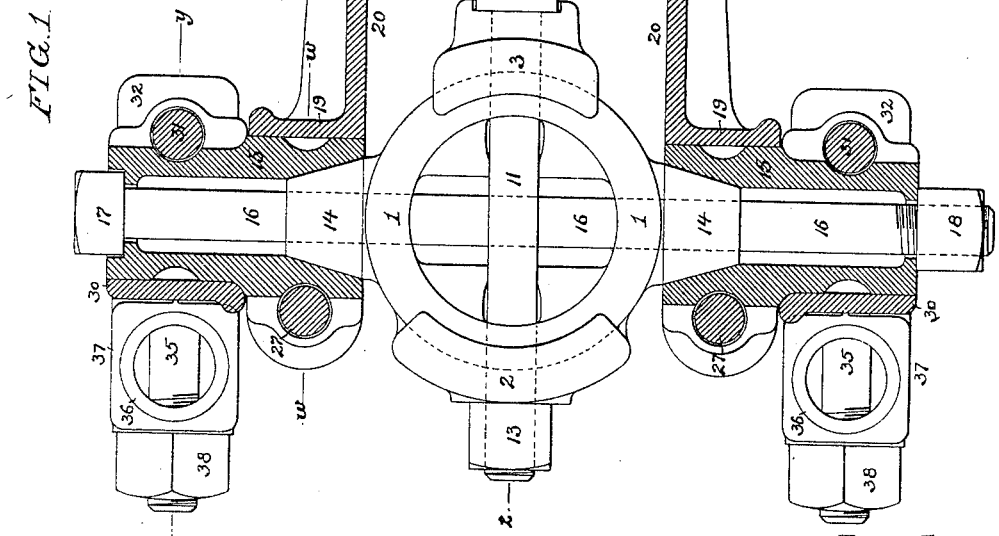

Figure 1 is a view, partly in top or plan view and partly in sectional plan, on the line $x\,x$, Fig. 2, of a rock-drill tripod constructed in accordance with my invention. Fig. 2 is a transverse section on the line $y\,y$, Fig. 1. Fig. 3 is a transverse section on the line $w\,w$, Fig. 1. Fig. 4 is a transverse section on the line $z\,z$, Fig. 1. Fig. 5 is a view similar to Fig. 4, but showing the clamping device slackened. Fig. 6 is a sectional plan view of part of the clamping device in the position shown in Fig. 5, and Figs. 7, 8, and 9 are views illustrating the application of my improved clamp to a drill in which a column or bar support is used instead of a tripod.

It is usual in modern rock-drills to provide the shell or casing which carries the cylinder of the drill with a circular projection or boss having beveled or undercut sides, which boss is confined to a base plate or block 1 of the tripod or other support by means of a pair of segmental clamping-jaws 2 and 3, both of these jaws being beveled or undercut, so as to overlap the correspondingly-beveled edges of the circular boss on the cylinder-shell.

The boss 2 usually forms part of the base plate or block 1, but the jaw 3 is adjustable, so that it may be caused to bear upon and clamp the projection or boss of the cylinder-shell or may be backed off so as to release the same and permit of the swinging of said cylinder-shell on the base-block for purposes of adjustment or the complete removal of the cylinder-shell from the tripod when such removal is desired.

One feature of my invention consists in the means adopted for mounting and adjusting the movable jaw of the clamp, so that the same can be readily tightened upon the boss of the cylinder-shell by the manipulation of a single nut or bolt, but will be self-releasing from engagement with the said boss when said nut or bolt is slackened. This construction is shown in Figs. 4, 5, and 6, on reference to which it will be observed that the base-plate 1 is rounded in horizontal cross-section on that side which carries the adjustable clamping-jaw 3 and has projecting from such rounded surface an inclined or beveled projection 4, having at the lower end a projecting finger 6, while above and on each side of said beveled projection 4 the base-plate has portions 5, which are rounded in vertical cross-section.

The jaw 3 is rounded transversely to accord with the rounded face of the base-plate 1, and said jaw has both at top and bottom beveled or undercut lips 7.

In the jaw 3 is formed a flaring opening 8, and in the base-plate are formed flaring openings 9 and 10, and through these openings passes the stem of a bolt 11, which has a head 12, adapted to the recessed outer face of the jaw 3, so that it is prevented from turning therein, the threaded portion of the bolt 11 receiving a nut 13, which is adapted to bear against the outer face of the fixed jaw 2 of the clamp. When the nut is tightened, the jaw 3 occupies the position shown in Fig. 4, the upper segmental lip of the clamp being in position to press upon the circular boss at the back of the cylinder-shell, while the lower lip 7 is at the upper end of the inclined projection 4 and bears upon the rounded face 5 of the base-plate. When the nut 13 is loosened, however, the jaw 3 will, owing to its own weight and that of the bolt 11, be self-releasing and will move outward and downward, so as to free itself from engagement with the boss of the cylinder-shell, the movement being in part a swinging movement permitted by the rounded bearings 5 and in part a sliding movement of the lower lip 7 downwardly and outwardly along the beveled projection 4, the movement being finally arrested by the projecting finger 6 at the bottom of the incline. All that is necessary, therefore, in order to effect the release of the cylinder-shell from the tripod is to slacken the nut 13, and the confinement of the cylinder-shell to the tripod can be as readily effected by the tightening of the nut, the latter operation causing movements of the clamping-jaw 3 which are the reverse of the movements in opening. The attendant can thus effect the release or reclamping of the cylinder-shell by one hand, having simply to manipulate the nut 13 for this purpose. Hence his other hand is free to effect any desired readjustment of the cylinder-shell on the tripod, whereas if both hands had to be used in manipulating the clamping device for the cylinder-shell another attendant would be required in order to adjust the latter in position for being reclamped.

The base-plate 1 has oppositely-projecting beveled hubs 14, which are adapted to correspondingly-beveled openings in sleeves 15, and through the said sleeves and base-plate passes a bolt 16, which has at one end a head 17, adapted to a recess in one of the sleeves 15, and upon the opposite end a nut 18, adapted to bear against the outer end of the opposite sleeve 15, so that by tightening the nut 18 the base-plate can be rigidly secured to the sleeves, but upon slackening said nut the base-plate will be released or loosened and can be adjusted around an axis coinciding with that of the bolt 16.

It is, as will be evident, immaterial upon which part the beveled trunnions are formed so long as the sleeves have a clamping bearing upon the base-plate.

Surrounding the sleeves 15 are split hubs 19, forming part of cheek-pieces 20, each of these cheek-pieces having at the rear end a hub 21 with beveled opening therein for the reception of the beveled end of a hollow block 22, which carries the rear leg 23 of the tripod, said block being secured to the hubs 21 of the cheek-pieces by means of a bolt 24, having a head 25, fitting in a recess in one of the hubs 21, the threaded end of the bolt having a nut 26, which bears against the opposite hub 21.

Each of the split hubs 19 is contracted upon its corresponding sleeve 15, so as to firmly clamp the same, by means of a transverse bolt 27, having a head 28, adapted to a recess in one wing of the split hub, and a nut 29, bearing upon the opposite wing of the hub, as shown in Fig. 3, the bolt being adapted to a circumferential groove in the sleeve, as shown in Figs. 1 and 3, so that lateral displacement of the sleeve and cheek-pieces is prevented.

To the outer projecting portion of each sleeve 15 is adapted a split ring 30, which can be tightened upon the sleeve by means of a bolt 31, having a T-head 32, adapted to a recess in one part of the ring, and a nut 33, bearing upon the other part of the ring, as shown in Fig. 2, the bolt being adapted to a circumferential recess in the sleeve, as shown in Figs. 1 and 2, so as to prevent lateral displacement of the ring on the sleeve.

Each ring 30 has at one side a projecting boss 34, through which passes a bolt 35, which has a head 36, adapted to a recess at one end of the boss 34, so that the bolt is prevented from turning. Each bolt 35 also passes through the upper end of a side leg 36 of the tripod and through the head or collar 37, with which said leg is provided, said head or collar having on the inner side a face (roughened, if desired) which bears against a corresponding face at the end of the boss 34 and at the outer side a face which constitutes a bearing for a nut 38, adapted to the threaded end of the bolt 35. By this means provision is afforded for universal adjustment of either of the side legs 36, swinging movement around an axis coincident with the axis of the bolt 16 being permitted when the nut 33 of the bolt 31 is loosened, so as to slacken the ring 30, and swinging movement around an axis coincident with the axis of the bolt 35 being permitted when the nut 38 on said bolt 35 is loosened, each of these movements being independent of the other, whereby movement in either plane can be effected while the leg is perfectly rigid in the other plane.

By providing the cheek-pieces 20 with split hubs 19, adapted to be clamped upon the sleeves 15, raising or lowering of the rear ends of the cheek-pieces can be effected without slackening the connection between the sleeves 15 and the beveled trunnions of the base-plate 1, a result which is frequently desirable.

The movable jaw 3 is, it will be observed, detachable on removing the bolt 11, and said jaw is of like conformation at top and bottom, so that it can be reversed in case of accident to the lip which engages the boss on the cylinder-shell.

In Figs. 7, 8, and 9 I have shown the application of my improved clamp to a base-plate 1ª, mounted upon a bar 40, which may be the vertical standard or a laterally-projecting bar of the same or any suitably-supported bar of a drill-support. The base-plate 1ª has a split ring 41, which is clamped upon the bar 40 by means of a bolt 42 and nut 43 at one side and a pair of bolts 44 with nuts 45 at the other side, the pair of bolts being used in order to provide a space between them for the jaw 3, and thereby bring the supporting-face of the base-plate as close as possible to the bar 40.

In all cases ordinary bolts and nuts are used for clamping purposes, so that the machine cannot be disabled by inability to replace specially-constructed bolts, thereby overcoming an objection to drill-supports now in use in which such special bolts are used.

It will be observed that by my construction I provide a drill which can be operated by one operator without assistance, the work of setting and adjusting being accomplished in a simple and effective manner by such single operator, a result heretofore impossible in prior devices of this class.

Having thus described my invention, I claim and desire to secure by Letters Patent—

1. A rock-drill support having a base-plate or block with beveled projection at one side, a clamping-jaw and a transverse bolt for securing the latter, said beveled projection of the base-plate extending outwardly beyond the bearing of the lower portion of the clamping-jaw, when the latter is closed, whereby said jaw, as it is closed and opened, is caused to slide up and down on the beveled projection, substantially as specified.

2. A rock-drill support having a base-plate or block with beveled projection at one side terminating at the lower end in an outwardly-projecting finger, a clamping-jaw and a transverse bolt for securing the latter, said beveled projection of the base-plate extending outwardly beyond the bearing of the lower portion of the clamping-jaw, when the latter is closed, whereby said jaw, as it is closed and opened, is caused to slide up and down on the beveled projection, and, when fully opened, rests upon the finger at the lower end of said projection, substantially as specified.

3. A rock-drill support having a base-plate or block with beveled projection at one side and rounded portion above the same, a clamping-jaw having on the under side a projecting lip, and a transverse bolt for securing said jaw, said projecting lip having a bearing upon the rounded portion of the base-plate, when the jaw is closed, and said beveled projection of the base-plate extending outwardly beyond said bearing-point, whereby the jaw, as it is closed and opened, is caused to slide up and down on the beveled projection, substantially as specified.

4. A rock-drill support having a base-plate or block with beveled projection at one side terminating at the lower end in a projecting finger, said base-plate having a rounded portion above said projection, a clamping-jaw having on the under side a projecting lip, and a bolt for confining said clamping-jaw to the base-plate, said projecting lip bearing against the rounded portion of the base-plate, when the jaw is closed, and said beveled projection of the base-plate extending outwardly beyond said bearing-point, whereby the jaw, as it is closed and opened, is caused to slide up and down on the beveled projection, substantially as specified.

5. A rock-drill support having a base-plate with flaring opening therethrough, and a beveled projection at one side, a clamping-jaw having flaring opening therein, and a bolt passing through the flaring openings of the base-plate and jaw and having a nut whereby it may be tightened so as to secure the jaw in its clamping position, said beveled projection of the base-plate extending outwardly beyond the bearing of the lower portion of the clamping-jaw, when the latter is closed, whereby said jaw, as it is closed and opened, is caused to slide up and down on the beveled projection, substantially as specified.

6. A rock-drill support having in combination a base-plate, laterally-projecting sleeves, cheek-pieces carrying the rear leg of the support, split rings mounted upon the sleeves and having bolts whereby they may be secured thereto, and side legs having a clamping bearing upon said split rings and confined thereto by bolts passing through the split rings and serving as pivot-bolts for the transverse swinging movement of the legs, said bolts being independent of those which secure the rings to the sleeves, substantially as specified.

In testimony whereof I have signed my name to this specification in the presence of two subscribing witnesses.

THOMAS H. PHILLIPS.

Witnesses:
F. E. BECHTOLD,
JOS. H. KLEIN.